US012575517B1

(12) United States Patent
Goudey

(10) Patent No.: US 12,575,517 B1
(45) Date of Patent: Mar. 17, 2026

(54) VARIABLE-DISPLACEMENT SPAR BUOY APPARATUS FOR MACROALGAE FARMING

(71) Applicant: Clifford A. Goudey, Newburyport, MA (US)

(72) Inventor: Clifford A. Goudey, Newburyport, MA (US)

( * ) Notice: Subject to any disclaimer, the term of this patent is extended or adjusted under 35 U.S.C. 154(b) by 0 days.

(21) Appl. No.: 18/752,651

(22) Filed: Jun. 24, 2024

Related U.S. Application Data

(60) Provisional application No. 63/524,214, filed on Jun. 29, 2023.

(51) Int. Cl.
*A01G 33/00* (2006.01)
*B63B 35/44* (2006.01)

(52) U.S. Cl.
CPC .............. *A01G 33/00* (2013.01); *B63B 35/44* (2013.01); *B63B 2035/4493* (2013.01)

(58) Field of Classification Search
CPC ....................................................... A01K 61/78
See application file for complete search history.

(56) References Cited

U.S. PATENT DOCUMENTS

| | | | | |
|---|---|---|---|---|
| 3,691,994 | A | * | 9/1972 | McPherson ............ A01K 61/60 119/223 |
| 4,147,130 | A | * | 4/1979 | Goguel .................. A01K 61/60 119/223 |
| 4,615,301 | A | * | 10/1986 | Maekawa .............. A01K 61/60 119/223 |

| | | | | |
|---|---|---|---|---|
| 4,704,990 | A | * | 11/1987 | Moxham ................ A01K 61/54 119/239 |
| 4,747,369 | A | * | 5/1988 | Gotmalm ............... A01K 61/60 114/264 |
| 5,193,481 | A | * | 3/1993 | Loverich ................ A01K 73/12 119/223 |
| 5,617,813 | A | | 4/1997 | Loverich et al. |
| 5,967,086 | A | * | 10/1999 | Knott, Sr. .............. A01K 61/60 119/223 |

(Continued)

FOREIGN PATENT DOCUMENTS

| | | | | | |
|---|---|---|---|---|---|
| CN | 105028247 A | * | 11/2015 | ............. | A01G 33/00 |
| CN | 105660359 A | * | 6/2016 | ............. | A01G 33/00 |

(Continued)

OTHER PUBLICATIONS

Prachi Patel, "Pilot Project Sends Kelp—and Carbon—to the Seafloor", IEEE Spectrum, Dec. 21, 2023, all pages.

*Primary Examiner* — Morgan T Jordan
(74) *Attorney, Agent, or Firm* — Ira D. Blecker

(57) ABSTRACT

An apparatus for farming macroalgae that includes a macroalgae farm and variable displacement spar buoy apparatuses connected to the macroalgae farm. Each of the spar buoy apparatus has a top sealed compartment having a gas and a bottom portion that is open at the bottom. A vent pipe extends from the bottom portion up through the top sealed compartment. The variable displacement spar buoy provides buoyancy by adding a gas to the bottom portion through the vent pipe and provides negative buoyancy by removing the gas from the bottom portion through the vent pipe. In this manner, variable buoyancy may be provided to the macroalgae farm to raise or lower the macroalgae farm.

20 Claims, 9 Drawing Sheets

(56)  References Cited

U.S. PATENT DOCUMENTS

| | | | | |
|---|---|---|---|---|
| 5,981,271 | A * | 11/1999 | Doucha | C12M 23/04 |
| | | | | 435/257.1 |
| 6,386,146 | B1 * | 5/2002 | Knott, Sr. | A01K 61/60 |
| | | | | 119/223 |
| 7,476,074 | B2 * | 1/2009 | Jakubowski | F03D 13/25 |
| | | | | 415/1 |
| 7,905,055 | B2 | 3/2011 | Wilcox | |
| 8,028,660 | B2 * | 10/2011 | Troy | A01K 61/00 |
| | | | | 119/223 |
| 8,235,629 | B2 * | 8/2012 | Jakubowski | F03D 13/22 |
| | | | | 290/55 |
| 9,326,493 | B2 * | 5/2016 | Han | A01K 61/80 |
| 9,655,347 | B2 * | 5/2017 | Troy | A01K 61/65 |
| 9,980,469 | B2 * | 5/2018 | Brosh | A01K 61/00 |
| 10,231,443 | B2 * | 3/2019 | Gace | A01K 61/95 |
| 10,257,990 | B1 * | 4/2019 | Goudey | B63B 35/00 |
| 10,518,849 | B2 * | 12/2019 | Lim | B63B 35/44 |
| 10,653,119 | B2 * | 5/2020 | Goudey | A01K 61/55 |
| 10,738,756 | B2 * | 8/2020 | Yang | F03B 13/10 |
| 10,973,211 | B2 * | 4/2021 | Dwyer | A01K 61/80 |
| 11,185,065 | B2 * | 11/2021 | DeNicola | A01M 23/08 |
| 11,820,629 | B2 * | 11/2023 | Pedretti | B66C 1/66 |
| 11,953,027 | B2 * | 4/2024 | Madsen | F03D 9/19 |
| 11,985,959 | B2 * | 5/2024 | Penner | A01K 61/60 |
| 12,041,914 | B2 * | 7/2024 | Fitzgerald | A01K 61/60 |
| 12,075,735 | B2 * | 9/2024 | Halvorson | A01G 33/00 |
| 2007/0193115 | A1 * | 8/2007 | Buck | A01G 33/00 |
| | | | | 47/65.5 |
| 2009/0126265 | A1 * | 5/2009 | Rasmussen | C12M 41/34 |
| | | | | 47/1.4 |
| 2009/0288612 | A1 * | 11/2009 | Himmelstrup | B63B 21/50 |
| | | | | 114/230.1 |
| 2013/0152864 | A1 * | 6/2013 | Grajcar | F21V 3/061 |
| | | | | 362/101 |
| 2013/0232867 | A1 * | 9/2013 | Orridge | A01K 61/10 |
| | | | | 47/1.4 |
| 2014/0339145 | A1 * | 11/2014 | Hur | C02F 1/00 |
| | | | | 210/232 |
| 2015/0130191 | A1 * | 5/2015 | Houvener | F03D 13/25 |
| | | | | 290/55 |
| 2017/0247087 | A1 * | 8/2017 | Sims | B63B 21/50 |
| 2020/0056578 | A1 * | 2/2020 | Sheldon-Coulson | F03B 17/06 |
| 2020/0367457 | A1 * | 11/2020 | Grassi | A01G 33/00 |
| 2021/0112786 | A1 * | 4/2021 | Fries | A01K 61/78 |
| 2021/0214048 | A1 * | 7/2021 | Johnsen | A01K 61/65 |
| 2021/0244005 | A1 * | 8/2021 | Sinclair | A01G 33/00 |
| 2023/0094823 | A1 * | 3/2023 | Bowie | B63B 21/20 |
| | | | | 114/294 |
| 2023/0399805 | A1 * | 12/2023 | Washbrook | E02B 3/046 |
| 2025/0059719 | A1 * | 2/2025 | Wold | G02B 6/0008 |

FOREIGN PATENT DOCUMENTS

| | | | | | |
|---|---|---|---|---|---|
| CN | 105684975 | A | * | 6/2016 | A01K 61/00 |
| CN | 105850708 | A | * | 8/2016 | A01G 33/00 |
| CN | 106069925 | A | * | 11/2016 | A01G 33/00 |
| CN | 106718818 | A | * | 5/2017 | A01G 33/00 |
| CN | 106818453 | A | * | 6/2017 | A01G 33/00 |
| CN | 106973779 | A | * | 7/2017 | A01G 33/00 |
| CN | 107258529 | A | * | 10/2017 | A01G 33/00 |
| CN | 108012917 | A | * | 5/2018 | A01G 33/00 |
| CN | 108522386 | A | * | 9/2018 | A01K 61/65 |
| CN | 109006450 | A | * | 12/2018 | A01G 33/00 |
| CN | 109169251 | A | * | 1/2019 | A01G 33/00 |
| CN | 109197723 | A | * | 1/2019 | A01K 61/73 |
| CN | 109380012 | A | * | 2/2019 | A01G 9/02 |
| CN | 109430136 | A | * | 3/2019 | A01K 61/78 |
| CN | 110352844 | A | * | 10/2019 | C02F 3/32 |
| CN | 111348153 | A | * | 6/2020 | B63B 21/50 |
| CN | 111994218 | A | * | 11/2020 | A01K 61/65 |
| CN | 112167135 | A | * | 1/2021 | B63B 21/50 |
| CN | 114128654 | A | * | 3/2022 | A01G 33/00 |
| CN | 114475940 | A | * | 5/2022 | A01K 61/65 |
| GB | 2507075 | A | * | 4/2014 | B63B 35/00 |
| JP | 2008162299 | A | * | 7/2008 | B63B 22/00 |
| KR | 100885630 | B1 | * | 2/2009 | A01K 61/65 |
| KR | 100925403 | B1 | * | 11/2009 | A01K 61/65 |
| KR | 20090125358 | A | * | 12/2009 | A01K 61/65 |
| KR | 20100011240 | U | * | 11/2010 | F03D 9/257 |
| KR | 101000346 | B1 | * | 12/2010 | C02F 3/101 |
| KR | 20110003384 | U | * | 4/2011 | A01G 31/02 |
| KR | 20110047074 | A | * | 5/2011 | A01K 61/65 |
| KR | 20120076794 | A | * | 7/2012 | F03D 13/20 |
| KR | 101348070 | B1 | * | 1/2014 | A01G 33/00 |
| KR | 20140061569 | A | * | 5/2014 | A01K 61/65 |
| KR | 20140114485 | A | * | 9/2014 | A01K 67/30 |
| KR | 20140121014 | A | * | 10/2014 | B63B 43/18 |
| KR | 101540892 | B1 | * | 7/2015 | A01K 61/54 |
| KR | 20150081983 | A | * | 7/2015 | A01G 33/00 |
| KR | 20150103435 | A | * | 9/2015 | A01G 33/00 |
| KR | 20160107484 | A | * | 9/2016 | A01K 61/00 |
| KR | 20160107485 | A | * | 9/2016 | A01G 33/00 |
| KR | 20170017642 | A | * | 2/2017 | A01C 11/003 |
| KR | 20170136187 | A | * | 12/2017 | B63B 43/06 |
| KR | 101817205 | B1 | * | 1/2018 | A01K 61/75 |
| KR | 20190018083 | A | * | 2/2019 | A01K 61/54 |
| KR | 20200031804 | A | * | 3/2020 | A01K 61/65 |
| KR | 102230467 | B1 | * | 3/2021 | A01K 61/17 |
| KR | 102347116 | B1 | * | 1/2022 | F21V 9/40 |
| KR | 20220138491 | A | * | 10/2022 | A01K 61/78 |
| KR | 102500637 | B1 | * | 2/2023 | A01K 61/78 |
| KR | 102541979 | B1 | * | 6/2023 | H02G 13/80 |
| KR | 20230135366 | A | * | 9/2023 | B63B 21/29 |
| NO | 20161805 | A1 | * | 5/2018 | A01K 61/65 |
| NO | 344480 | B1 | * | 1/2020 | A01K 61/60 |
| NO | 20240817 | A1 | * | 3/2025 | B63B 22/04 |
| WO | WO-2017075727 | A1 | * | 5/2017 | A01K 61/65 |
| WO | WO 2022/246301 | A2 | | 11/2022 | |

* cited by examiner

Fig. 3

VARIABLE-DISPLACEMENT SPAR BUOY APPARATUS FOR MACROALGAE FARMING

STATEMENT REGARDING FEDERALLY SPONSORED RESEARCH OR DEVELOPMENT

This invention was developed in part during the conduct of U.S. Department of Energy ARPA-E Award Number DE-AR0000912, a project titled "The Development of Techniques for Tropical Seaweed Cultivation and Harvesting." The government has certain rights in the invention.

TECHNICAL FIELD

The present invention relates to the growing of kelp and other types of macroalgae (collectively referred to as macroalgae) in large quantities on and in the ocean. The device and methods described present a means of farming these seaweeds for the purpose of providing food, chemical feed stocks, and a biomass suitable for the production of biofuels.

BACKGROUND OF THE INVENTION

As the fossil-fuel age draws to a close there will remain a substantial need for liquid fuels, so an increasing proportion of energy and products will have to come from biomass. At the same time, due to increased population and current food consumption trends, the world will need to produce 50-70% more food by 2050. Using conventional production techniques, these two paradigm shifts would require the increased use of land space for crops, which may be difficult given other land-use requirements. However, the oceans present a solution through the production of various seaweeds, or macroalgae, that can serve multiple purposes by both feeding humanity and powering civilization. Given the vastness of the oceans and the rapid growth rates of seaweeds, a significant portion of our food and energy needs could be met by farming the oceans.

Present methods of macroalgae farming position the growing crop near the surface of the ocean where there is ample sunlight to drive the photosynthetic productivity. Marine macroalgae requires seawater, sunlight, and nutrients. Because of the limited depths to which sunlight can penetrate, most natural seaweed beds occur in shallow water over seabed substrates to which it can successfully attach. Present methods of seaweed farming involve the installation of suitable substrates such as ropes to which early-stage macroalgae can attach or are artificially attached. By placing these substrates at or close to the sea surface, useful growth can occur.

However, sufficient nutrients are not always available at the surface of the ocean and growth rates and survival depends on water temperatures staying in an acceptable range. Often nutrient-rich, cooler water is plentiful at depths below the surface. Others have attempted to induce artificial upwellings to bring those nutrient-rich, cooler waters to the surface so a macroalgae farm can benefit. Unfortunately, moving cooler water up from the depths can be energy intensive and there is a tendency for that cooler and denser water to immediately return to depth. An alternative approach is to periodically move the farm to sea depths where nutrients can be absorbed and then return to the surface and the sunlight. Ideally this could be done in a diurnal cycle such that the farm is shallow and receiving sunlight during the day and submerged at night absorbing nutrients. Preliminary experiments have shown that this periodic vertical movement, known as depth cycling, can result in macroalgae growth rates that are significantly greater than a farm that remains at the surface.

Maintaining optimal growing temperatures is also a good reason to adjust the depth of a farm. For example, in the warmest of seasons, water conditions at midday and the afternoon can approach lethal temperatures that can be avoided simply by moving the farm to deeper, cooler, waters.

Finally, extreme weather provides another compelling reason to sink a farm. While a storm is raging overhead and surface conditions are too energetic for the survival of the crop, a submerged farm can wait out the storm and return to the surface to continue normal growth.

In order to realize profitable and efficient production of macroalgae biomass in the ocean, technologies are needed to support their cultivation. The key challenge addressed by this invention is enabling the optimal growth of macroalgae by providing sunlight and nutrients and enabling the survival of the crops by avoiding both excessive temperatures and storm-induced excess energy that can be experienced at the surface.

BRIEF SUMMARY OF THE INVENTION

The present invention offers advantages over present hardware and methods and enables the practical and economical depth cycling of macroalgae farms on the high seas.

The various advantages and purposes of the present invention in solving the problems described above and hereafter are achieved by providing, according to a first aspect of the invention, a floating buoy apparatus that supports a macroalgae farm that can be made to sink.

According to a second aspect of the invention there is a floating buoy apparatus that supports a macroalgae farm that can be remotely commanded to sink using various forms of telemetry.

According to a third aspect of the invention there is a floating buoy apparatus that supports a macroalgae farm that can be remotely commanded to sink and wherein the macroalgae farm is circular and the floating buoy apparatus is in the center of the circular macroalgae farm.

According to a fourth aspect of the invention there is a floating buoy apparatus that when manually or remotely commanded to sink, will after a preset time, return to the surface.

According to a fifth aspect of the invention there is a floating buoy apparatus that uses a gas chamber to vary its underwater displacement such that when the gas is vented water enters, the floating buoy apparatus becomes negatively buoyant, and sinks. Using the same principal, when the gas is moved into that gas chamber, water is displaced, the floating buoy apparatus becomes positively buoyant, and it returns to the surface.

According to a sixth aspect of the invention there is a floating buoy apparatus where the gas needed to return the floating buoy apparatus to the surface is provided by a compressed gas tank that is housed within or proximal to the floating buoy apparatus itself.

According to a seventh aspect of the invention there is a floating buoy apparatus where the gas consumed to return the floating buoy apparatus to the surface is replenished using a source of renewable energy such as a solar panel, a wave energy converter, a wind turbine, or a water current turbine.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description, which follows taken in conjunction with the accompanying drawings in which:

FIG. 3 represents a side view of the variable-displacement spar buoy apparatus of FIG. 2.

DETAILED DESCRIPTION OF THE INVENTION

Figure 1:
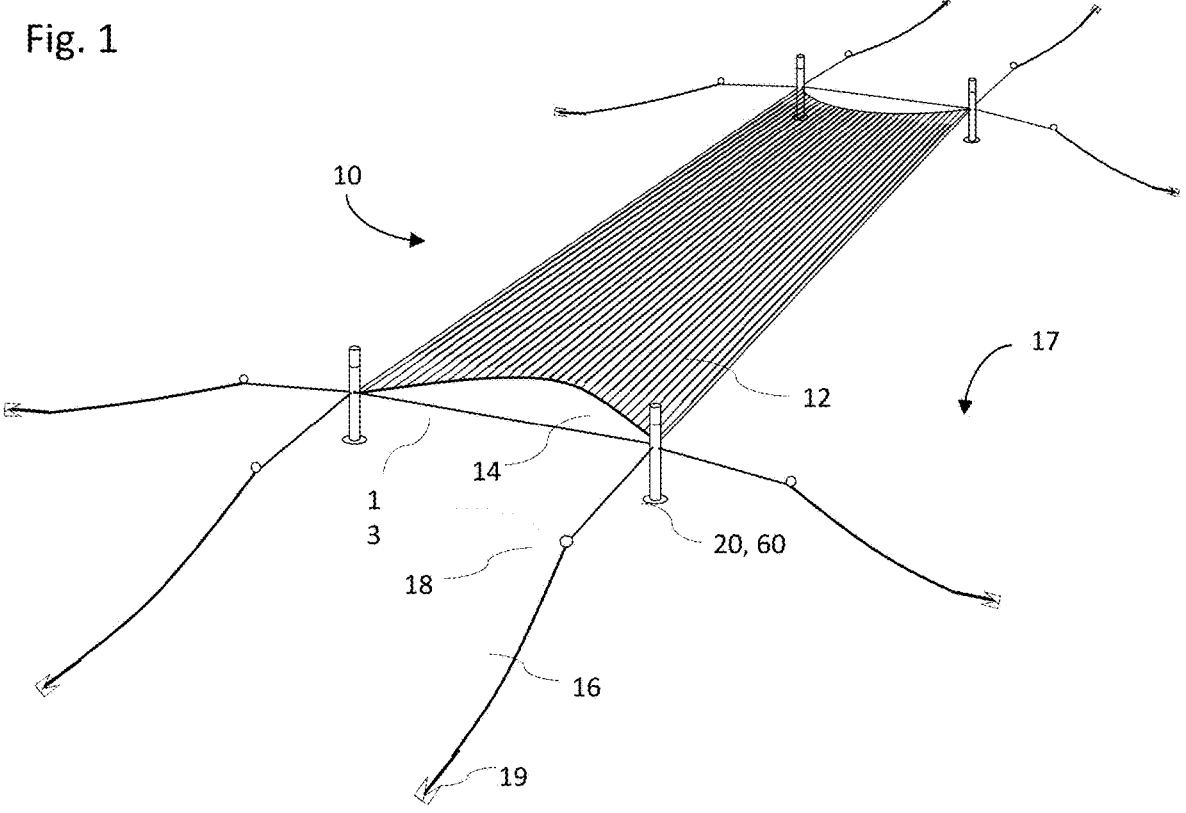
FIG. 1 represents a macroalgae farm composed of a single catenary module.

Referring to the figures in more detail, and particularly referring to FIG. 1, there is shown a perspective view of an example of a macroalgae farm 10 where the macroalgae (not shown) is grown on longlines 12 that are suspended between a pair of support lines 14 which preferably are catenary lines 14. At the end of each catenary line 14 there is a variable-displacement spar buoy apparatus 20, 60 supporting each corner of the macroalgae farm 10 and transferring the outward-tending force from the anchor lines 16 providing desirable pretension to the catenary lines 14 and in turn to the longlines 12. Each anchor line 16 is fitted with a tensioner buoy 18 that bears a portion of the vertical component of tension in the anchor lines 16. At the end of each anchor line 16 is an anchor 19 that embeds into the seabed 17. Also shown is transverse framing line 13, the length of which defines the proportions of the catenary lines 14. This combination of anchors 19 and anchor lines 16 combine to hold the macroalgae farm 10 in place against the forces of wind, waves, and currents.

Figure 2:
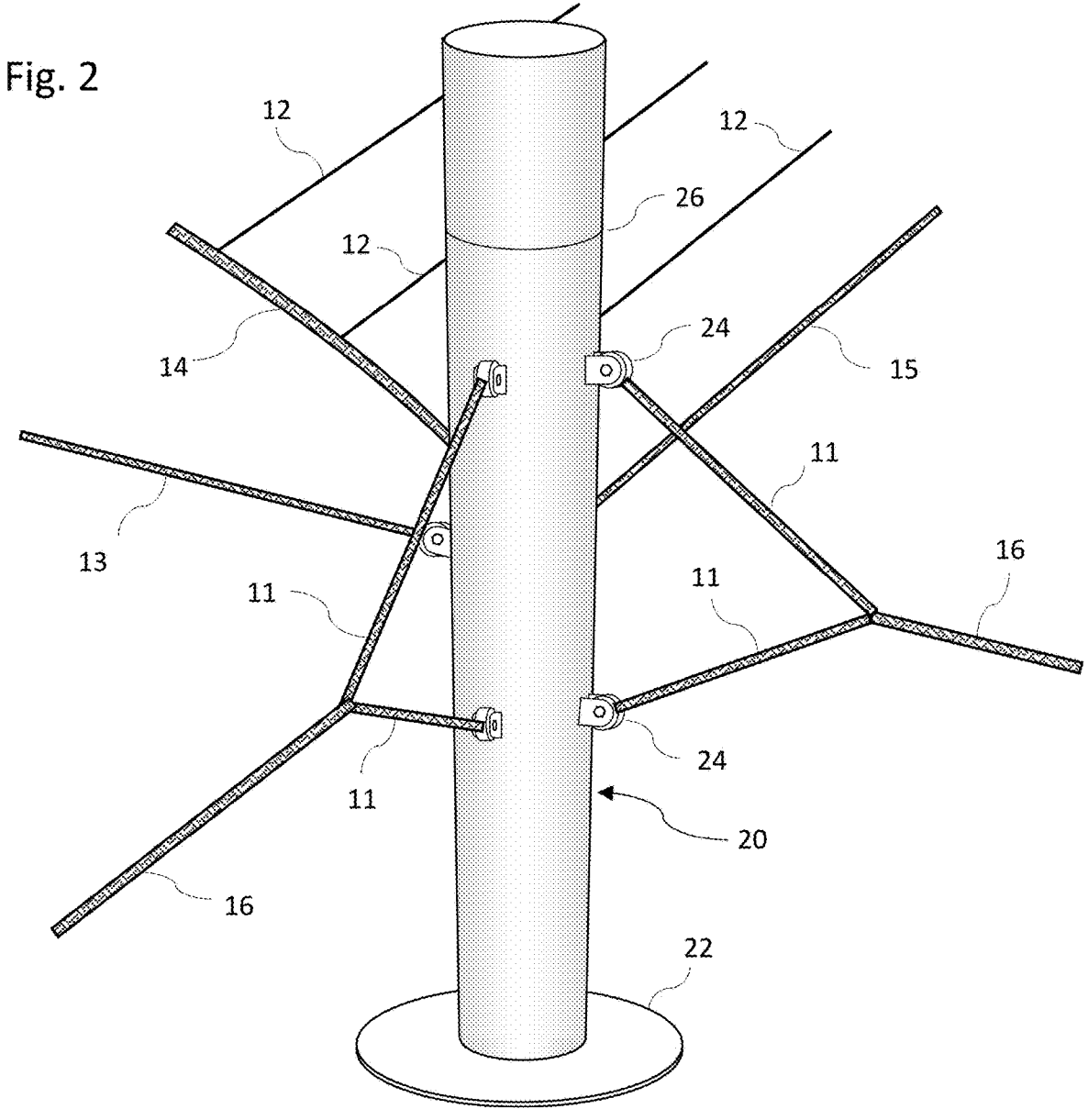
FIG. 2 represents a perspective view of an exemplary embodiment of a variable-displacement spar buoy apparatus.

Referring now to FIG. 2, there is shown a more detailed perspective view of an exemplary embodiment of the variable-displacement spar buoy apparatus 20. Also shown are transverse framing line 13, longitudinal framing line 15, anchor lines 16, catenary line 14, and longlines 12. Also detailed in this figure are anchor line bridles 11 and attachment points 24, five of which are visible and two of which are hidden by the variable-displacement spar buoy 20. Damper/ballast plate 22 is shown attached to the base of variable-displacement spar buoy apparatus 20, serving to provide upright stability for variable-displacement spar buoy apparatus 20 and reduce any vertical heave motions. Waterline 26 is indicated on variable-displacement spar buoy apparatus 20, showing that typically the variable-displacement spar buoy apparatus 20 is mostly submerged with only it's top portion visible.

Figure 3:
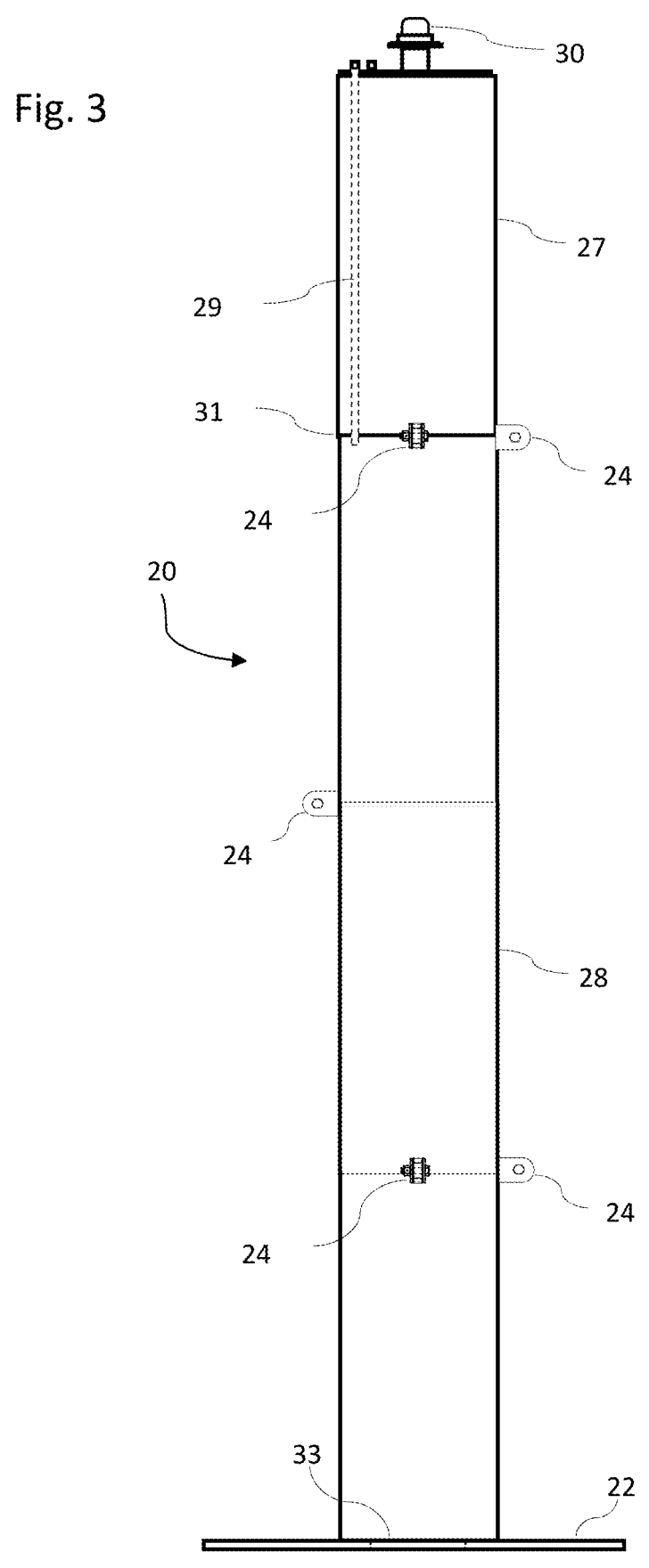

Referring now to FIG. 3, there is shown a side view of variable-displacement spar buoy apparatus 20 of FIG. 2. Also shown are attachment points 24 and damper/ballast plate 22. The variable-displacement spar buoy apparatus 20 may be divided into two portions. Top portion 27 is a sealed cylindrical compartment that is filled with air or some other gas and at approximately atmospheric pressure. Bottom portion 28 is water tight but open at the bottom, in effect a bell jar. Vent pipe 29 leads from the top of variable-displacement spar buoy 20, passes through top portion 27, and through the bulkhead 31 that separates top portion 27 from the bottom portion 28. This vent pipe 29 allows both the addition of air or some other gas to bottom portion 28 and the removal of air or some other gas from the bottom portion 28. As the gas is manually introduced to bottom portion 28 through vent pipe 29 water is expelled out the bottom opening 33 in damper/ballast plate 22. The addition of this gas makes variable-displacement spar buoy apparatus 20 more buoyant and is either capable of supporting more weight in the farm crop in the farm 10 or the variable-displacement spar buoy apparatus 20 and the remainder of the farm 10 raise in the water column. Also shown in this FIG. 3 is an optional solar-powered flashing light 30.

Figure 4:
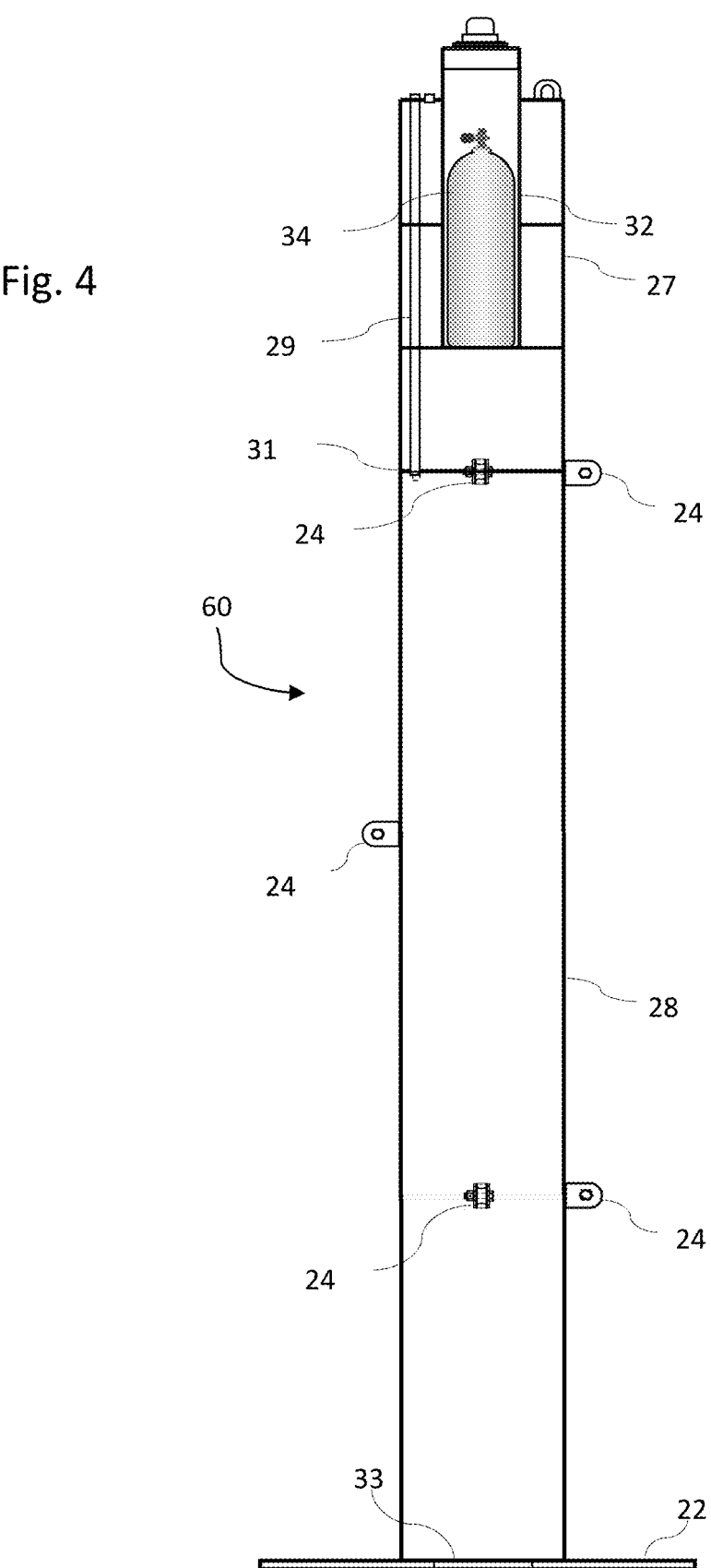
FIG. 4 represents a side view of an exemplary embodiment of a remote-controlled variable-displacement spar buoy apparatus showing a cut-away view of the top portion of the variable-displacement spar buoy apparatus.

Referring now to FIG. 4, there is shown a side view of the variable-displacement spar buoy apparatus 60 with the top portion 27 cut away to reveal the interior. This version of the variable-displacement spar buoy apparatus 20 enables remote sinking and re-floating because it contains a compressed air tank 34 that is housed within a central cylindrical compartment 32. Also shown in this cut-away view is the vent pipe 29.

Figure 5:
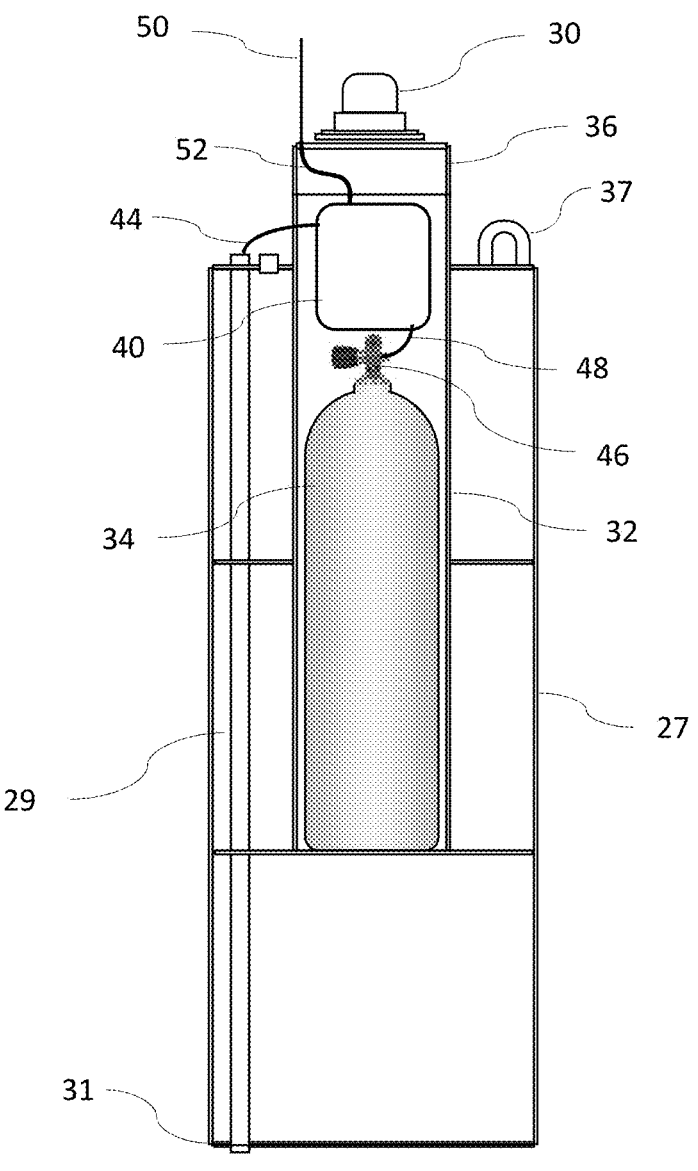
FIG. 5 represents a detailed cut-away view of the top portion of the variable-displacement spar buoy apparatus of FIG. 4.

Referring now to FIG. 5, there is shown a more detailed view of the cut-away portion of the variable-displacement spar buoy apparatus 60 shown in FIG. 4. In addition to the central cylindrical compartment 32 and the compressed gas tank 34, there is control box 40 that is connected to external antenna 50 by means of an antenna cable 52. This control box 40 is also connected to vent pipe 29 by means of gas hose 44. The gas provided to vent pipe 29 to raise the variable-displacement spar buoy apparatus 60 comes from the compressed gas tank 34. The control box 40 is also connected to the compressed gas tank 34 by means of second gas hose 48. A pressure regulator 46, mounted to the output of compressed gas tank 34, regulates the gas pressure supplied to control box 40. The gas in compressed gas tank 34 may be replenished using a source of renewable energy (not shown) such as a solar panel, a wave energy converter, a wind turbine or a water current turbine. Also shown in FIG. 5 is solar-powered flashing light 30 and a tie-up point 37.

Figure 6A:
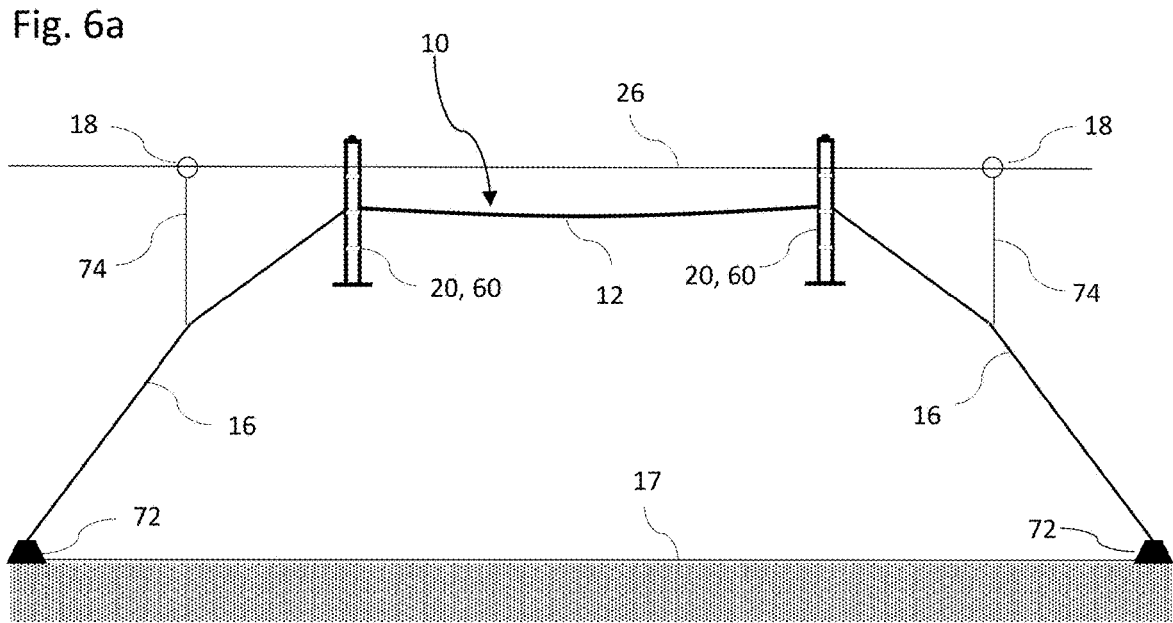
FIGS. 6a and 6b represent a side view of a macroalgae farm revealing the depth cycling of the farm using the variable-displacement spar buoy apparatus of FIGS. 2 and 4.

Referring now to FIG. 6a, there is shown the macroalgae farm 10 of FIG. 1. Macroalgae farm 10 is positively buoyant, stretched horizontally between the opposing anchor lines 16 and their associated anchors 72. At each corner of the macroalgae farm 10 is a variable displacement spar buoy apparatus 20, 60 (only two are visible in this side view). Part way up anchor line 16 is attached buoy line 74 which attaches to buoy 18, serving to impose pretension in the system to minimize the sag of growlines 12.

Figure 6B:
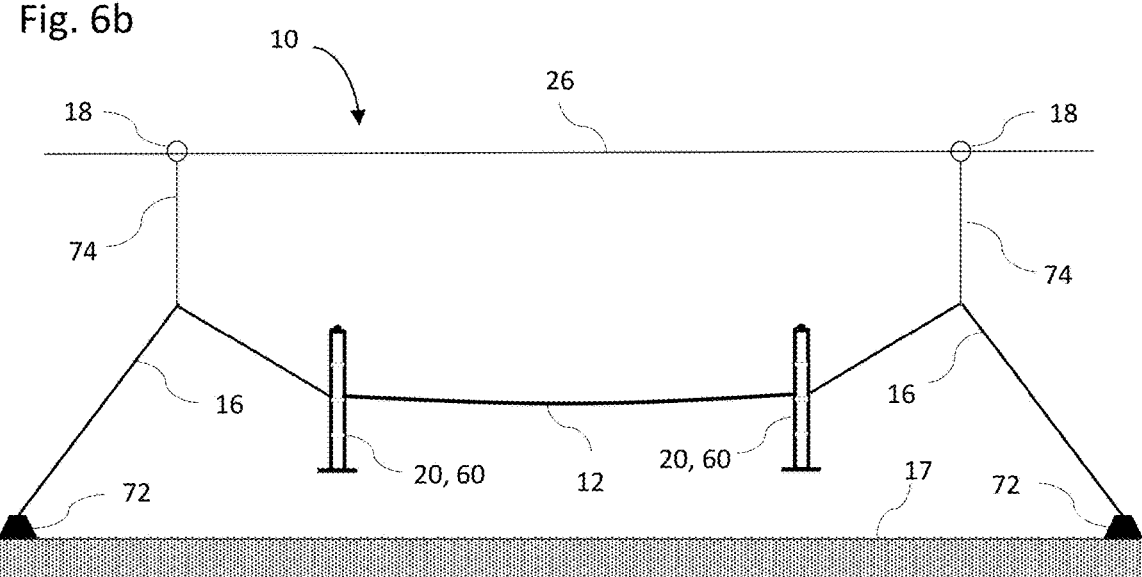

Referring now to FIG. 6b, there is macroalgae farm 10 in a deeper position. This deeper position is due to variable displacement spar buoy apparatus 20, 60 being flooded and sinking due to gas being removed from the bottom portion of variable displacement spar buoy apparatus 20, 60. A signal, for example a radio signal, may be sent to each variable displacement spar buoy apparatus 20, 60 to vent the gas out of the bottom portion of variable displacement spar buoy apparatus 20, 60 through vent pipe 29 and the vented air is replaced by water entering through the bottom opening 33 in damper/ballast plate 22. As the variable displacement spar buoy apparatus 20, 60 sinks, the macroalgae farm 10 sinks along with it. The special role of buoy line 74 and buoy 18 becomes apparent in how it preserves the pretension in macroalgae farm 10 even in this sunk position.

To raise the macroalgae farm 10, gas is sent to the bottom portion of variable displacement spar buoy apparatus 20, 60 through vent pipe 29 to displace water in the bottom portion of variable displacement spar buoy apparatus 20, 60 so as to cause the variable displacement spar buoy apparatus 20, 60 to rise and therefore also raise the macroalgae farm 10. Since communication to the variable displacement spar buoy apparatus 20, 60 at depth may be difficult, a timer may be set to cause the gas to be sent to the bottom portion of variable displacement spar buoy apparatus 20, 60.

Figure 7A:
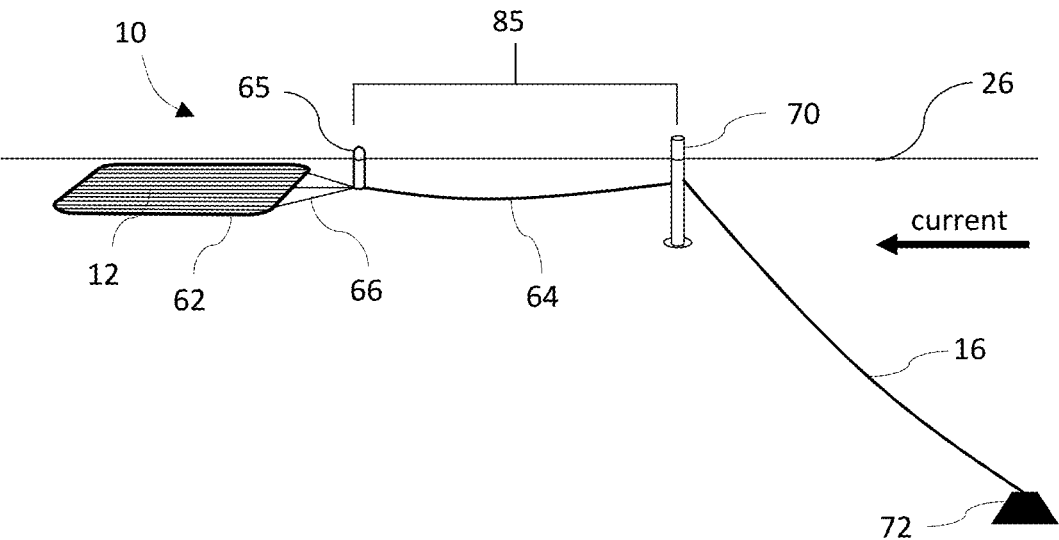
FIGS. 7a and 7b represent the use of a variable-displacement spar buoy apparatus for controlling the depth of a macroalgae farm supported by a single-point mooring.
Figure 7B:
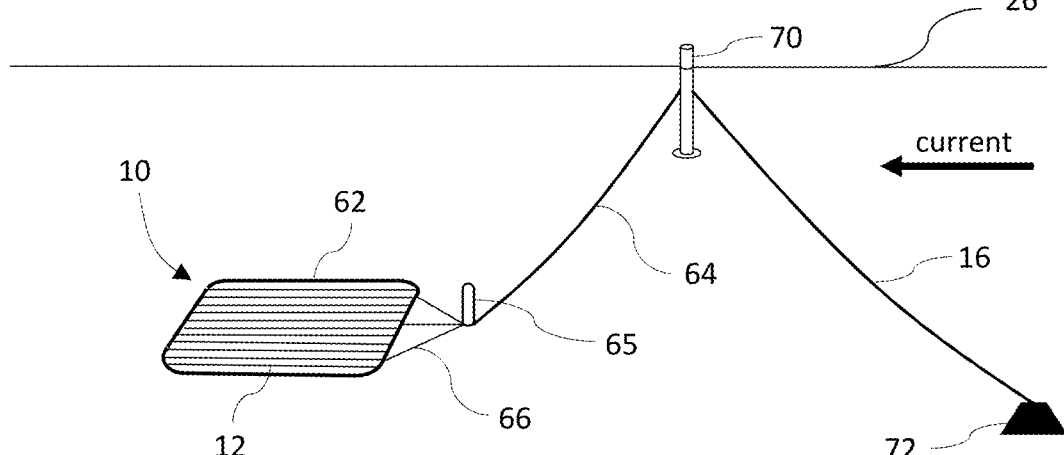

Referring now to FIGS. 7a and 7b, there is shown an exemplary embodiment in which the variable displacement spar buoy apparatus 85 comprises a first variable displacement spar buoy apparatus 65 and a second spar buoy 70. Second spar buoy 70 may or may not be a variable displacement spar buoy apparatus having the capability to raise and lower the macroalgae farm 10. In this exemplary embodiment, the first variable displacement spar buoy apparatus 65 that raises or lowers the macroalgae farm 10 is separated from the macroalgae farm 10.

FIG. 7a is a perspective view of the macroalgae farm 10 that is in the form of a rectangular framework 62 that supports a multitude of longlines 12. This framework 62 is neutrally buoyant and generally streams horizontal due to a prevailing current indicated by the current arrow. The framework 62 is connected to first variable displacement spar buoy apparatus 65 by two or more bridles 66. The first variable displacement spar buoy apparatus 65 is a variable-buoyancy chamber 65 which means that its relation to the sea level is variable and may be at the sea level or at substantial depth, as needed for the purposes of the macroalgae farm 10. The first variable displacement spar buoy apparatus 65 is, in turn, connected to second spar buoy 70 by a mooring tether 64. The spar buoy 70 is connected to anchor 72 by a mooring line 16.

Referring now to FIG. 7b, there is shown a perspective view of the same macroalgae farm 10 as shown in FIG. 7a, but with framework 62 in a deeper position. This deeper position is due to first variable displacement spar buoy apparatus 65 being flooded and sinking, bringing along framework 62 by means of its connection to first variable displacement spar buoy apparatus 65 by two of more bridles 66. Tether 64 not only provides the needed mechanical support to hold macroalgae farm 10 in place, but it also includes a gas hose (not shown) that is used to either add a gas, such as air, air to first variable displacement spar buoy apparatus 65 for buoyancy or to vent the gas from first variable displacement spar buoy apparatus 65 for negative buoyancy. Second spar buoy 70 includes a controller, a telemetry means, and an air tank (not shown) that provides the gas to first variable displacement spar buoy apparatus 65 as needed. The controller and telemetry means allow the remote control of gas from second spar buoy 70 to and from first variable displacement spar buoy apparatus 65 from elsewhere, such as a shore location.

Figure 8A:
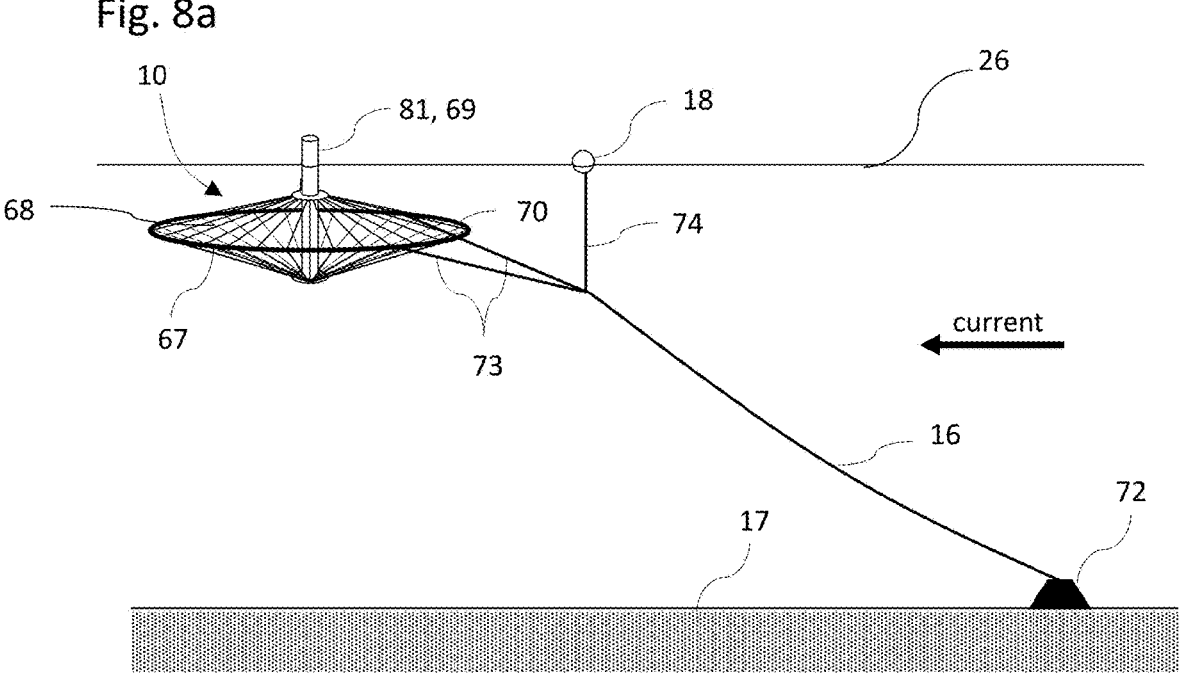
FIGS. 8a and 8b represent the use of a variable-displacement spar buoy apparatus for controlling the depth of a circular macroalgae farm supported by a single-point mooring.
Figure 8B:
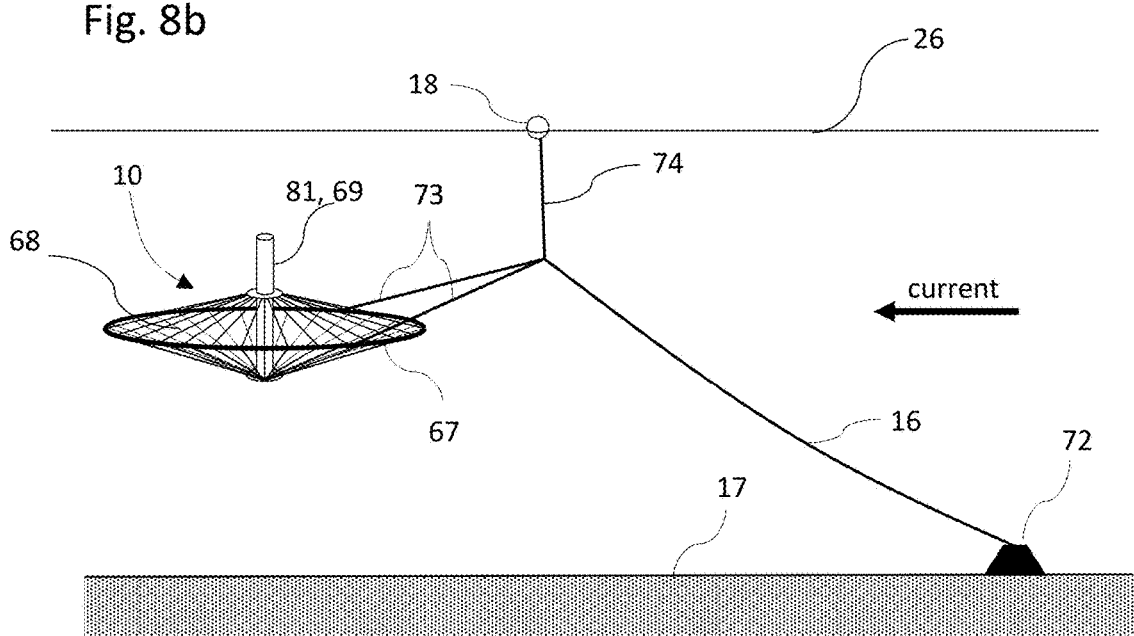

Referring now to FIGS. 8a and 8b, there is shown an exemplary embodiment in which the variable displacement spar buoy apparatus 81 is a variable displacement hub 69 surrounded by a circular rim 67.

FIG. 8a is a perspective view of an example of a macroalgae farm 10 that is in the form of a circular rim 67 with multiple spokes 68 that lead to the variable displacement hub 69. The macroalgae farm 10 is connected to a mooring line 16 by two or more bridles 73 attached to the circular rim 67. Where bridles 73 connect to mooring line 16, a vertical pennant line 74 connects to a surface buoy 18. The mooring line 16 leads to an anchor 72 that rests on the seabed 17.

The spokes 68 create a rigid geometry much like a bicycle wheel and also serve as growlines for the macroalgae farm. The depth of the circular rim 67 relative to the waterline 26 is controlled by the amount of air in variable displacement hub 69, which, like the variable-displacement spar buoy apparatus 20 described in FIG. 3, has a top portion 27 (not shown) and a bottom portion 28 (not shown). When air in introduced to bottom portion 28, variable displacement hub 69 becomes buoyant and tends toward the surface as is shown in FIG. 8a.

Referring now to FIG. 8b, there is shown a perspective view of the same macroalgae farm 10 as shown in FIG. 8a, but with circular rim 67, spokes 68, and variable displacement hub 69 in a deeper position relative to the waterline 26. This deeper position is due to the bottom portion 28 (not shown) of variable displacement hub 69 being flooded making the assemblage negatively buoyant. Bridles 73 and pennant 74 not only provides the needed mechanical support to hold macroalgae farm 10 in place, but they also can include a gas hose (not shown) that is used to either add a gas, such as air, to the bottom portion 28 of variable displacement hub 69.

Figure 9A:
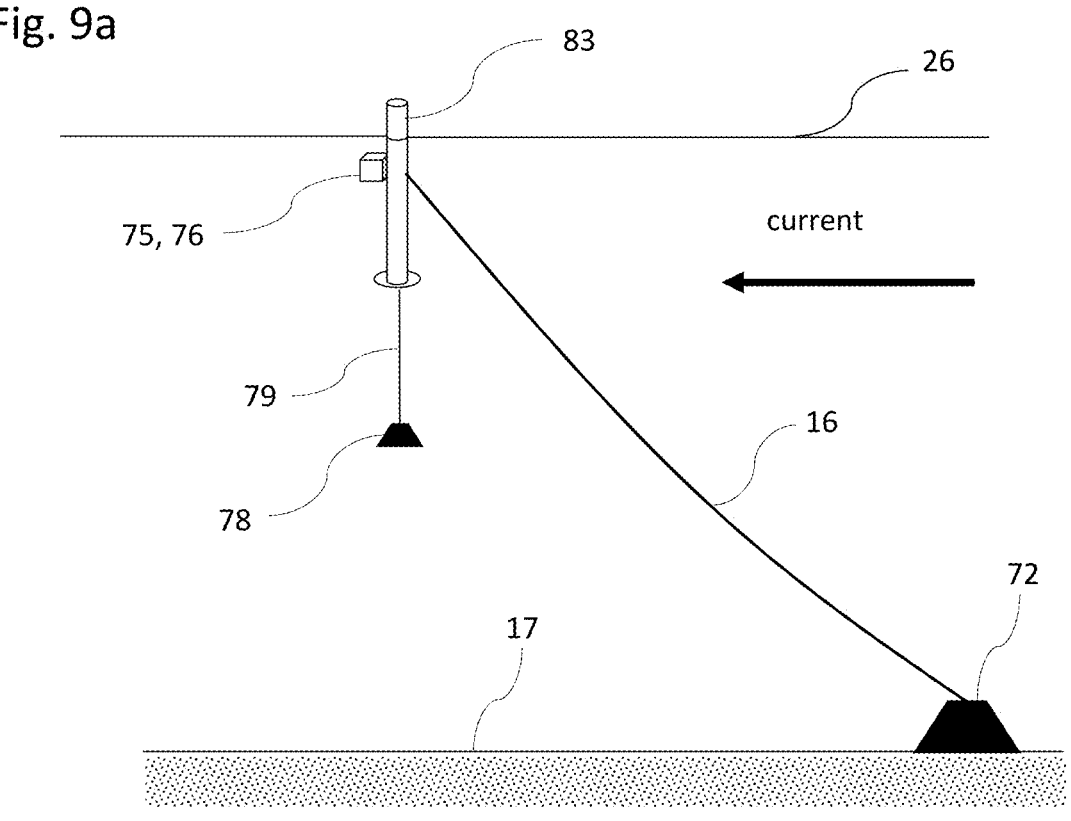
FIGS. 9a and 9b represent a variable-displacement spar buoy apparatus supported by a single-point mooring used for controlling the depth of an instrumentation package or a fish trap.
Figure 9B:
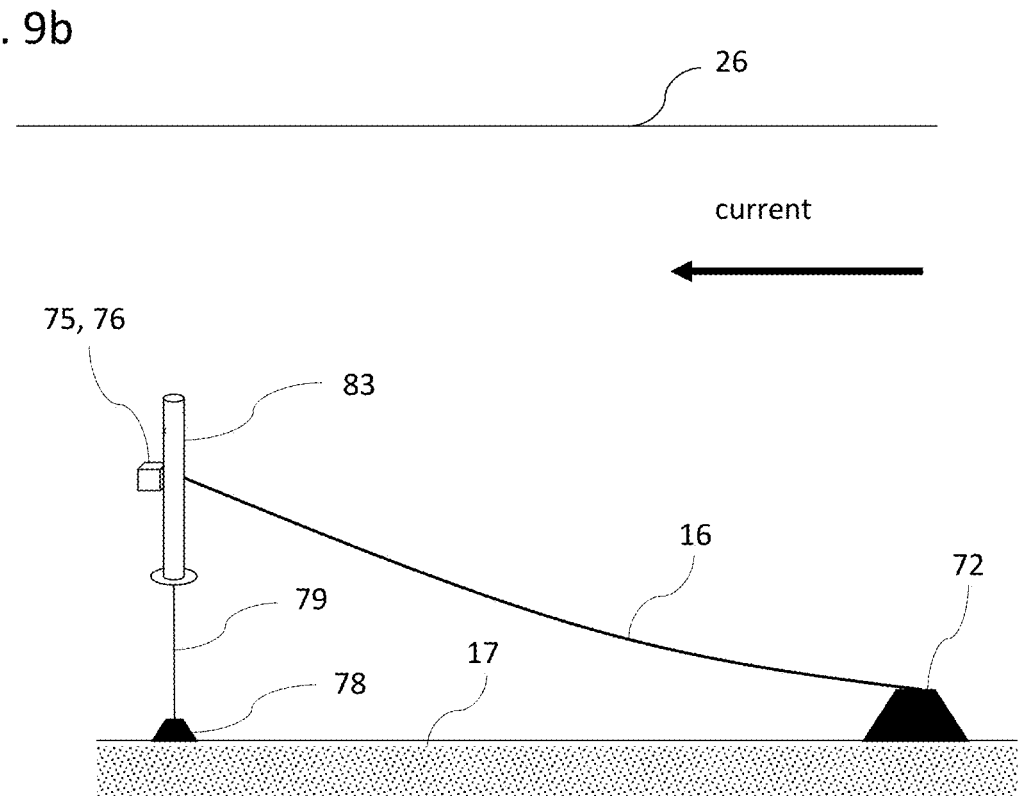

Referring now to FIGS. 9a and 9b, there is shown an exemplary embodiment in which a variable displacement spar buoy apparatus 83 is a variable displacement spar buoy to which is attached an instrumentation package 75 or a fish trap 76. In this exemplary embodiment, the variable displacement spar buoy apparatus 83 raises or lowers the instrumentation package 75 or a fish trap 76 since the connection is rigid. However, the instrumentation package 75 or a fish trap 76 could be connected to the variable displacement spar buoy apparatus 83 via a tether (not shown).

FIG. 9a is a perspective view of an example of the variable displacement spar buoy apparatus 83 connected to anchor 72 that rests on the seabed 17 by a mooring line 16 and in this example the variable displacement spar buoy apparatus 83 is buoyant and at the surface. Hanging from the bottom of variable displacement spar buoy apparatus 83 by means of a tether 79 is a ballast weight 78.

FIG. 9b is a perspective view of the variable displacement spar buoy apparatus 83 made to be negatively buoyant by means of controlled flooding described earlier. The depth to which variable displacement spar buoy apparatus 83 descends is controlled by the tether 79 and ballast weight 78 which, once ballast weight 78 reached the seabed 17 the descent of the variable displacement spar buoy apparatus 83 is stopped.

A novel aspect of the exemplary embodiments is that the gas in the inventive variable displacement spar buoys may be modulated. That is, if it is desirable to sink any of the variable displacement spar buoys 20, 60, 65, 81, 83, only enough gas from the bottom portion of variable displacement spar buoy apparatus 20, 60 is vented through vent pipe 29 to make the variable displacement spar buoys 20, 60, 65, 81, 83 go awash. Once the variable displacement spar buoys 20, 60, 65, 81, 83 are below the surface, the remaining air in the bottom portion of the variable displacement spar buoys 20, 60, 65, 81, 83 will compress with depth and the sinking will accelerate.

Similarly, when it is time to return the variable displacement spar buoys 20, 60, 65, 81, 83 to the surface, only enough gas need be added to the bottom portion of the variable displacement spar buoys 20, 60, 65, 81, 83 through vent pipe 29 to begin its ascent. Once the variable displacement spar buoys 20, 60, 65, 81, 83 begin to rise, this initial gas will expand as it rises toward the surface depth and the ascent will accelerate.

By thus conserving the available gas in the variable displacement spar buoys 20, 60, 65, 81, 83, replacement of the gas supply may be deferred until a later time. Deferring replacement of the gas supply is desirable since replacing the gas supply is a laborious process.

Of course, if conserving gas is not an issue, venting all of the gas from the bottom portion of the variable displacement spar buoys 20, 60, 65, 81, 83 will hasten the descent and adding a lot of gas to the bottom portion of the variable displacement spar buoys 20, 60, 65, 81, 83 will hasten the ascent.

It will be apparent to those skilled in the art having regard to this disclosure that other modifications of this invention beyond those embodiments specifically described here may be made without departing from the spirit of the invention. For example, variable-displacement spar buoy apparatus 20, 60, 65, 81, 83 is depicted as an elongated cylinder but it needn't be cylindrical or elongated. Furthermore, the compressed gas tank 34 is a separate tank that is placed within central cylindrical compartment 32. However, the storage of compressed gas could be within the central cylindrical compartment 32 itself or encompass the entire top portion 27. Similarly, the method of communication to and from the controller of this system can be a radio, a cell phone, or a satellite link. Accordingly, such modifications are considered within the scope of the invention.

What is claimed is:

1. An apparatus for farming macroalgae in a body of water, comprising:

a macroalgae farm comprising:

longlines for supporting a growth of macroalgae;

first and second support lines positioned such that a first end of each longline is joined to the first support line and a second end of each longline is joined to the second support line;

a variable displacement spar buoy apparatus connected to each of the first and second support lines of the macroalgae farm, the variable displacement spar buoy apparatus comprising a cylindrical body that has:

a top sealed cylindrical compartment housing a gas supply, and a bottom water tight portion that is open at the bottom, wherein the bottom water tight portion is in communication with a vent pipe extending through the top sealed cylindrical compartment, the vent pipe allows gas from the gas supply to be added to, or removed from, the bottom water tight portion;

a mooring line connected to each variable displacement spar buoy apparatus, the mooring line connected to an anchor in contact with a seabed such that the mooring line and anchor are sufficient to keep the macroalgae farm within a predetermined area;

wherein the variable displacement spar buoy apparatuses in one condition provide buoyancy to the macroalgae farm by adding the gas through the vent pipe to the bottom water tight portion to displace the water in the bottom water tight portion and in a second condition provide negative buoyancy to the macroalgae farm by removing the gas from the water tight portion through the vent pipe to increase the water in the bottom water tight portion so as to cause the macroalgae farm to descend to a predetermined depth in the body of water.

2. The apparatus of claim 1 wherein the variable displacement spar buoy apparatus includes a controller that is remotely commanded by telemetry to cause the spar buoy apparatus to rise or descend in the body of water.

3. The apparatus of claim 2 wherein after the variable displacement spar buoy apparatus is remotely commanded to descend in the body of water, a timer having a preset time causes the variable displacement spar buoy apparatus to rise in the body of water.

4. The apparatus of claim 1 wherein the variable displacement spar buoy apparatus has a gas chamber within the top sealed compartment comprising the gas that varies the underwater displacement of the variable displacement spar buoy apparatus.

5. The apparatus of claim 4 wherein the gas chamber comprises compressed gas.

6. The apparatus of claim 4 wherein the gas in the gas chamber is replenished by a source of renewal energy.

7. An apparatus for farming macroalgae in a body of water, comprising:

a macroalgae farm comprising longlines for supporting a growth of macroalgae;

a variable displacement spar buoy apparatus connected to the macroalgae farm wherein the variable displacement spar buoy apparatus has the capability to be buoyant or negatively buoyant, the variable displacement spar buoy apparatus comprising a cylindrical body that has:

a top sealed cylindrical compartment housing a gas supply, and a bottom water tight portion that is open at the bottom, wherein the bottom water tight portion is in communication with a vent pipe extending through the top sealed cylindrical compartment, the vent pipe allows gas from the gas supply to be added to, or removed from, the bottom water tight portion;

wherein the variable displacement spar buoy apparatus in one condition provide buoyancy to the macroalgae farm by adding the gas to the bottom water tight portion to displace the water in the bottom water tight portion and in a second condition provide negative buoyancy to the macroalgae farm to increase the water in the bottom water tight portion so as to cause the macroalgae farm to descend to a predetermined depth in the body of water.

8. The apparatus of claim 7 wherein the variable displacement spar buoy apparatus includes a controller that is remotely commanded by telemetry to cause the spar buoy apparatus to rise or descend in the body of water.

9. The apparatus of claim 8 wherein after the variable displacement spar buoy apparatus is remotely commanded to descend in the body of water, a timer having a preset time causes the variable displacement spar buoy apparatus to rise in the body of water.

10. The apparatus of claim 7 wherein the variable displacement spar buoy apparatus has a gas chamber within the top sealed compartment comprising the gas supply that varies the underwater displacement of the variable displacement spar buoy apparatus.

11. The apparatus of claim 10 wherein the gas chamber comprises compressed gas.

12. The apparatus of claim 11 wherein the gas in the gas chamber is replenished by a source of renewal energy.

13. The apparatus of claim 7 wherein the macroalgae farm is circular and the variable displacement spar buoy apparatus is situated in the center of the macroalgae farm.

14. The apparatus of claim 13 wherein the macroalgae farm has an outer rim and the longlines extend between the outer rim and the variable displacement spar buoy apparatus.

15. The apparatus of claim 14 wherein the variable displacement spar buoy apparatus is perpendicular to a plane containing the longlined and the outer rim.

16. A method of depth cycling a macroalgae farm in a body of water, the method comprising:

providing a macroalgae farm comprising longlines for supporting a growth of macroalgae;

providing a variable displacement spar buoy apparatus connected to the macroalgae farm wherein the variable displacement spar buoy apparatus has the capability to be buoyant or negatively buoyant; the variable displacement spar buoy apparatus comprising a cylindrical body that has:

a top sealed cylindrical compartment housing a gas supply, and a bottom water tight portion that is open at the bottom, wherein the bottom water tight portion is in communication with a vent pipe extending through the top sealed cylindrical compartment, the vent pipe allows gas from the gas supply to be added to, or removed from, the bottom water tight portion;

upon a first instruction to the variable displacement spar buoy apparatus, providing buoyancy to the macroalgae farm by the variable displacement spar buoy apparatus so as to cause the macroalgae farm to remain at a first predetermined depth in the body of water;

upon a second instruction to the variable displacement spar buoy apparatus, providing negative buoyancy to the macroalgae farm by the variable displacement spar buoy apparatus so as to cause the macroalgae farm to descend to a second predetermined depth in the body of water.

17. The method of claim 16 further comprising remotely commanding by telemetry a controller on the variable displacement spar buoy apparatus to rise or descend in the body of water.

18. The method of claim 17 wherein after remotely commanding the variable displacement spar buoy apparatus to descend in the body of water, further comprising executing a timer after a preset time causing the variable displacement spar buoy apparatus to rise in the body of water.

19. The method of claim 16 wherein providing buoyancy comprises providing a gas from the gas supply through the vent pipe into the bottom water tight portion; and wherein providing negative buoyancy comprises venting a gas from the bottom water tight portion up through the vent pipe.

20. The method of claim 16 further comprising modulating the gas into and out of the bottom water tight portion by providing only enough gas to the bottom water tight portion to enhance the buoyancy of the variable displacement spar buoy apparatus and removing only enough gas from the bottom water tight portion to decrease the buoyancy of the variable displacement spar buoy apparatus.

* * * * *